Dec. 8, 1953   E. C. THOMPSON   2,661,630
GEAR SHIFT MECHANISM
Filed Jan. 28, 1953   2 Sheets-Sheet 1

Eual C. Thompson
INVENTOR.

Dec. 8, 1953          E. C. THOMPSON                2,661,630
                    GEAR SHIFT MECHANISM
Filed Jan. 28, 1953                          2 Sheets-Sheet 2

Eual C. Thompson
INVENTOR.

Patented Dec. 8, 1953

2,661,630

UNITED STATES PATENT OFFICE 2,661,630

GEAR SHIFT MECHANISM

Eual C. Thompson, Atlanta, Ga.

Application January 28, 1953, Serial No. 333,635

5 Claims. (Cl. 74—477)

This invention relates to automotive transmissions and more particularly to a repair attachment for the gear shift mechanism of such transmissions which will obviate troublesome and annoying characteristics of certain types of transmissions.

In 1949 and later models of Chevrolet automobiles, as well as certain models of the Kaiser, Frazer, G. M. C. pick-up trucks, Henry J., All State and other automobiles the gear shift mechanism used is subject to undesirable characteristics when the shift rails of the transmission have become worn to such a point as to permit slight movement thereof when not actuated by the conventional shift rod. Due to the construction of the gear shift mechanism, a condition may prevail wherein the mechanism cannot be disengaged from its gear shifting position to perform other and subsequent gear shift actuation. The transmission utilizes conventional shift rails provided with recesses into which spring urged balls are projected for maintaining the shift rails in proper position both during gear shift operation and in the so-called "neutral" position. After a certain period of use, the recesses become elongated thereby permitting slight axial movement of the shift rail in response to jarring or bumping of the vehicle which, in turn, slightly moves the shift rod which permits the gear shift mechanism to misalign and prevent subsequent gear shift operation. A temporary remedy for this situation may be effected by manual manipulation of the shift rods themselves so as to align the gear shift mechanism allowing normal movement of its actuating mechanism. A more permanent remedy is, of course, to replace the shift rail and spring urged ball to prevent the undesirable axial movement thereof which may be imparted through jarring or bouncing of the vehicle.

An object of the present invention is to overcome these defects in existing gear shift mechanisms and to provide a structure which may be integrally constructed in new vehicles or be added as an attachment to existing vehicles.

A primary object of this invention is to provide a repair attachment for the gear shift mechanism of Chevrolet automobiles as well as other vehicles which will prevent the above described misalignment and will obviate the necessity of replacing the shift rails and their spring urged ball, a necessarily laborious and costly procedure.

Another object of this invention is to provide a repair attachment for Chevrolet automobiles which is of economical manufacture and permits of rapid and economical installation obviating an otherwise laborious and costly repair.

Another object of this invention is to provide a repair attachment for Chevrolet automobile gear shift mechanisms which will maintain the shifting yoke in properly aligned relation during actuation of the manual shift lever in performing a sequential gear shift operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
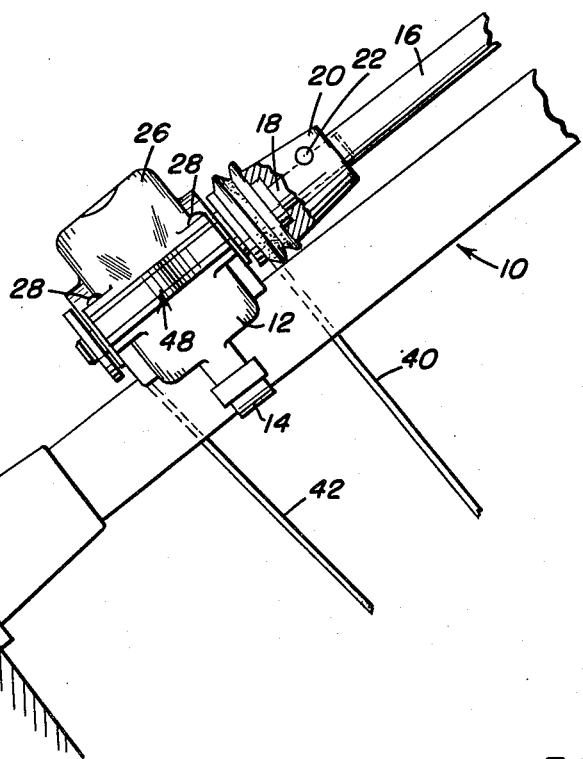
Figure 1 is a vertical elevation of a portion of a steering column of an automobile provided with the usual gear shifting mechanism to which is applied the novel repair attachment.

Referring now more particularly to Figure 1, reference numeral 10 indicates generally a steering column extending below the fire wall of an automobile; reference numeral 12 indicates the main body portion of the transmission shift box which is secured by U-clamp 14 to the steering column. A shifting column 16 is actuated in response to a well known manual shifting lever and imparts either or both a rotary and axial sliding motion to an actuator shaft 18 extending laterally from the shift box. The coupling between the shifting column and the actuator shaft is effected by means of the collar 20 connected to the shifting column engaging the actuator shaft through the pin 22 and the groove 24 in the shaft.

The shift box is normally provided with a cover 26 which engages directly on the upper surface of the main body portion 12 and is secured thereto by means of the bolts 28. Each, the main body portion and the cover, are provided with opposed semi-circular cut-away portions which present spaced bearing surfaces for the actuator shaft assembly.

Figure 3:
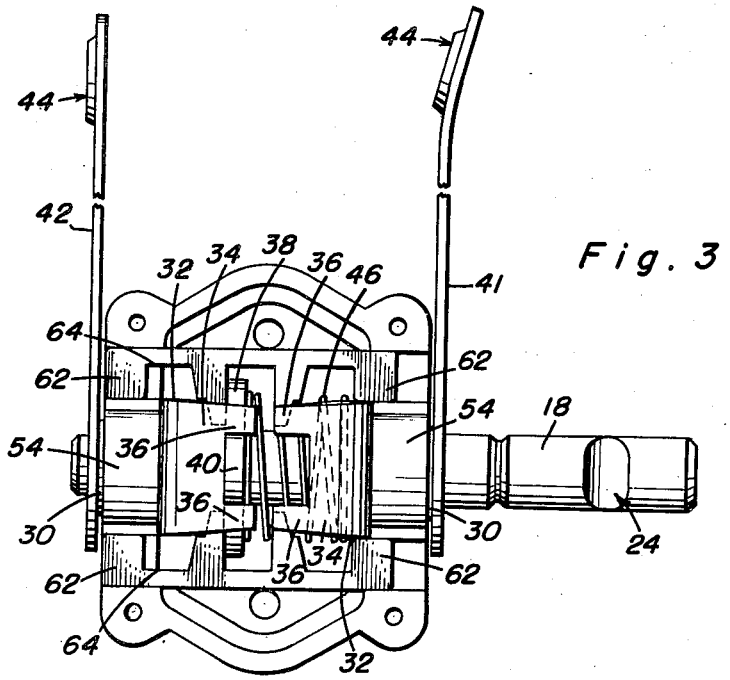
Figure 3 is a plan view of the gear shift box and its mechanism with the cover removed showing the repair attachment in place an in position to prevent movement of the low and reverse shifting yoke.
Figure 4:
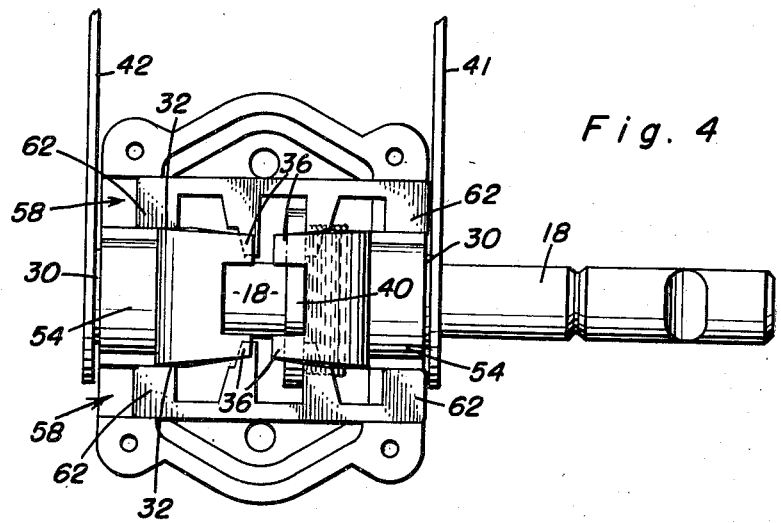
Figure 4 is a plan view similar to Figure 3 but showing the repair attachment positioned to prevent misalignment of the second and high shifting yoke.

Referring now more particularly to Figures 3 and 4, a pair of shifting yoke assemblies are provided at spaced intervals along the actuator shaft and each includes a collar 30, the outer surface of which is received in one of the aforementioned bearing surfaces or journals and the inner surface of which presents a pilot or bearing for the actuator shaft. An integral portion 32 extends radially from each collar and terminates in a laterally bent head 34 extending in spaced parallel relation to the actuator shaft, presenting an L-shaped yoke arm or fork extending from each collar and terminating at its free end in a pair of spaced prongs or tines 36.

The actuator shaft is provided with an abutment in the form of a circular flange or collar 38 and a radially extending projection or lug 40 extending therefrom, the latter being selectively engageable between the prongs 36 of the yoke assemblies to impart a rocking motion thereto in response to a rocking motion of the actuator shaft. The means by which the projection is engaged from one yoke assembly to another is by axial shifting of the actuator rod which is imparted through proper manipulation of the manual shift lever actuated by the vehicle operator, as is well known. Each of the yoke collars has rigidly secured thereto an actuating arm one of which, 41, actuates the low and reverse gears in the transmission and the other of which, 42, actuates the second and high gears in the transmission. The free ends of these arms are provided with apertured bosses 44 for removable connection to shift rods extending to the transmission mechanism proper, as is well known in the art.

A coil spring 46 is disposed within the gear box and engages against the collar 38 to normally maintain the projection or lug 40 between the prongs 36 of the second and high shifting fork assembly, as shown in Figure 3. Figure 4 shows the actuator shaft 18 and the projection 40 axially moved by manipulation of the hand shift lever to a position engaging the low and reverse shifting fork assembly.

The above described mechanism is conventional and depicts the gear shift mechanism as utilized in 1949 and later model Chevrolet automobiles. As was pointed out, slight movement of the transmission shift rails is permitted when they are worn, and sometimes occurs because of excessive tolerances in new automobiles to thus allow a slight rocking of the corresponding yoke assembly which will displace it from its normal position so that when the other yoke assembly is brought to a neutral position and the actuator rod and projection 40 subsequently attempted to be moved into engagement therewith, one of the prongs 36 will abut or engage against the surface of the projection presenting its disposition between the two prongs. Due to the fact that the low and reverse shifting fork assemblies must be actuated or rocked to a greater degree to effect interengagement than does the second and high shifting yoke, the movement of the former which is permitted by the worn shifting rails is consequently greater than the latter yoke assembly. If this were not true, mere manipulation of the manual shift lever back and forth would eventually effect alignment between the two yoke assemblies so that the projection could be disengaged from one and engaged with the other and result only in undue annoyance to the operator. However, since relatively little movement of the second and high shifting yoke assemblies may be effected before engagement of those gears, the low and reverse shift rail may become worn to such a point wherein it is impossible to align the two yoke assemblies without effecting a clashing of either the second or high gears when attempting to shift into either low or reverse.

To prevent this, the hereinafter described assembly is provided as a repair attachment to the above described conventional gear shift mechanism which positively prevents any rocking movement of the yoke assemblies not engaged by the actuator shaft projection 40 so that misalignment between the two yoke assemblies is obviated thereby allowing a smooth and proper shifting of gears at all times.

Figure 2:
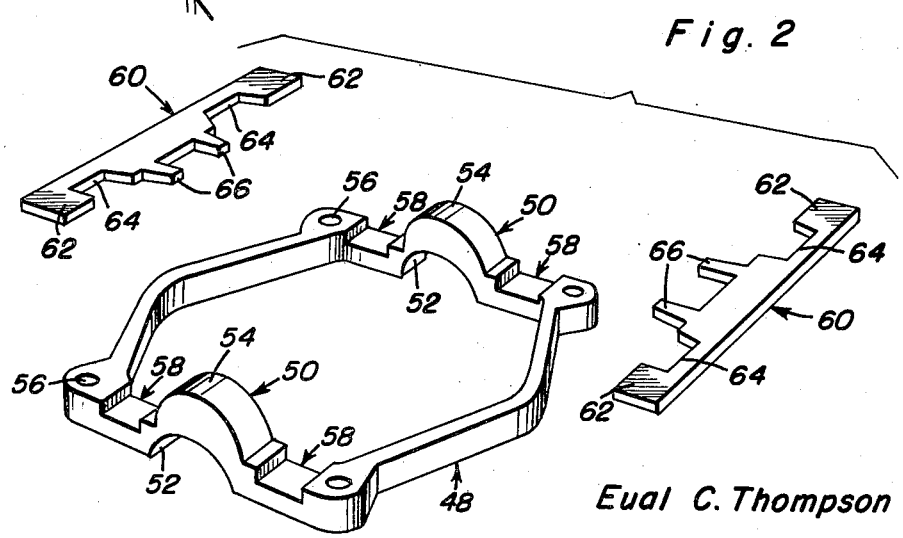
Figure 2 is an exploded perspective view of the repair attachment on an enlarged scale.

Referring now more particularly to Figures 2-4, the repair assembly comprises a spacer element designated generally by the reference character 48 and is of substantially rectangular configuration and is adapted to be disposed upon the upper surface of the main body 12 beneath the cover 26. Each end of the spacer is provided with a boss 50, the under surface 52 of which replaces the bearing surface for the collars 30 normally provided for by the cover 26 and the upper surface 54 of which receives the bearing surfaces of the cover. Each corner of the spacer is provided with an aperture or hole 56 to receive therethrough the screws or bolts 28 by which the cover, spacer, and main body portion are rigidly secured together.

On either side of each boss is provided a guide slot 58 and each corresponding pair of opposed guide slots are adapted to receive the latching or locking key members 60 slidably disposed therein. Each end of the locking members or keys are provided with an abutment ear 62 adjacent which are the clearance slots 64, for a purpose presently apparent, and medially disposed of each key is a pair of laterally extending lugs 66.

Referring now more particularly to Figures 3 and 4, the lugs 66 are adapted to be disposed on opposite sides of the collar 38 to be engaged thereby to impart sliding movement of the keys within the guide in response to movement of the actuator shaft and the collar. In the position shown in Figure 3, each of the locking keys has been moved by collar 38, to a position wherein the abutment ears 62 adjacent the second and high shifting yokes are out of engagement with the radially extending portions 32 of that assembly so that the clearance slots or spaces 64 will permit the second and high yoke assemblies to be rocked back and forth to engage a corresponding gear. At the same time, each key assembly has been moved to a position wherein the opposite abutting ear 62 abuts or engages against the radially extending portion 32 of the low and reverse yoke assembly to prevent any rocking motion thereof should the shift rail be worn.

Therefore, regardless of the condition of the transmission shift rail, the yoke assembly not engaged by the actuator projection 40, is positively prevented from rocking or misalignment. In Figure 4, the actuator shaft has been axially moved to position the projection 40 between the prongs 36 of the low and reverse shifting yoke assembly and the abutment ears 62 adjacent the second and high yoke assembly are now in position to abut against the radial projection 32 and prevent any rocking or misalignment of this latter yoke assembly as will be readily apparent.

It will be appreciated that the above described repair attachment results in the relatively simple arrangement of parts which may be easily installed in an automobile to correct difficulties arising therein of the nature set forth and will result in rapid and economical repair obviating the necessity of replacing the shift rail and spring urged ball which would be necessary if the repair attachment were not used.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A repair attachment for shift boxes having a rotatable and axially moveable actuator shaft provided with a collar having a radial projection selectively engageable with a pair of shifting yokes rockably mounted on the shaft, said attachment comprising means positioned on said shift box adjacent said yokes and having portions disposed laterally thereof presenting guides, means slidably carried in said guides engageable by said collar for movement therewith, said last means having abutment ears selectively engageable with that yoke out of engagement with said projection.

2. Gear shift mechanism comprising a body portion, actuated arms pivotally mounted on said body portion, an actuator shaft journaled on said body portion for a limited axial and rotatable movement, means on the shaft for selective operative cooperation with either of said arms for positively actuating the selected arm without actuating the unselected arm, movable means operatively mounted on the body portion and operatively connected to said shaft for positive cooperation with the unselected arm to prevent such unselected arm from rotating when the shaft is in its positive cooperative operating relation with the selected arm, and for preventing any unintentional rotative movement of said unselected arm irrespective of the relative angular position of the selected arm whereby only the selected arm in operative cooperation with the means on said shaft can be rotated.

3. Gear shift mechanism comprising a body, actuated arms pivotally mounted on said body, an actuator shaft journalled in said body for limited axial and rotatable movement, a collar fixed on said shaft and having a lug projecting therefrom, an L-shaped fork fixedly connected to each actuated arm, movable means operatively mounted on the body and positively connected to said collar for positive cooperation with the fork of the unselected arm to prevent such fork and its unselected arm from rotating when the shaft is in its positive cooperative operating relation with the fork of the selected arm, said movable means preventing any unintentional rotating movement of said unselected arm irrespective of the relative angular position of the selected arm whereby only the selected arm in operative cooperation with the lug on said shaft may be rotated.

4. A repair attachment for shift boxes having a rotatably and axially movable actuator shaft provided with an abutment and a radial projection selectively engageable with a pair of shifting elements rockably mounted on the shaft, said attachment comprising means positioned on said shift box and having adjacent said elements portions disposed laterally thereof presenting guides, means carried by said guides engageable by said abutment on said actuator shaft for movement therewith, said last means having abutment ears selectively engageable with the element out of engagement with said radial projection.

5. A repair assembly for positioning between the main body and cover of a shift box in which an axially movable and oscillatable shaft is mounted, said assembly comprising a generally rectangular spacer element of appreciable thickness and having an outline substantially the same as the meeting edges of the main body and cover, said spacer having arcuate-shaped bosses at opposite ends thereof presenting bearing surfaces for shifting elements mounted on the oscillatable shaft, said spacer having guide slots on opposite sides of said bosses adjacent the surface of the spacer from which the arcuate-shaped bosses project, a pair of locking keys, one locking key for sliding movement in the slots on one side of the bosses and the other locking key for sliding movement in the slots on the other side of said bosses said keys having abutment ears and adjacent grooves on the edge of said keys for projection inwardly relative to said frame, said keys being provided with abutment ears movable into the path of said shifting elements of the shift box and allowing free axial movement of the shaft, and means on said keys for engagement by an abutment flange carried by the shaft whereby the locking keys will move substantially parallel to the axis of said shaft.

EUAL C. THOMPSON.

References Cited in the file of this patent

UNITED STATES PATENTS

| Number | Name | Date |
|---|---|---|
| 2,180,579 | Butzbach | Nov. 21, 1939 |
| 2,185,830 | Burt | Jan. 2, 1940 |

FOREIGN PATENTS

| Number | Country | Date |
|---|---|---|
| 966,844 | France | Oct. 19, 1950 |